No. 676,461. Patented June 18, 1901.
E. GEISEL.
DISINTEGRATOR.
(Application filed Aug. 24, 1899.)
(No Model.) 2 Sheets—Sheet 2.

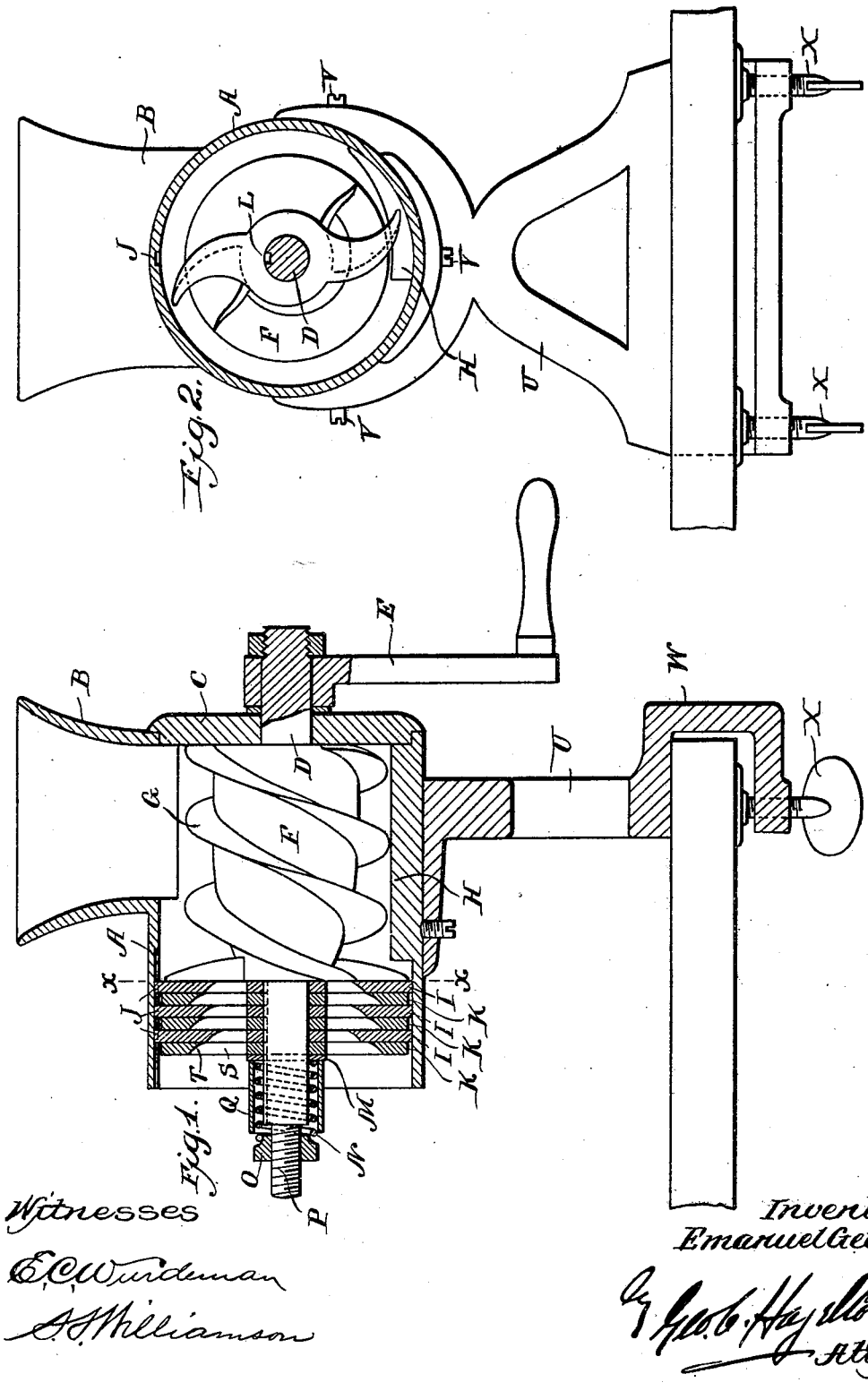

Witnesses
E. C. Wurdeman
A. S. Williamson

Inventor
Emanuel Geisel
by Geo. E. Hamilton
Atty

UNITED STATES PATENT OFFICE.

EMANUEL GEISEL, OF PHILADELPHIA, PENNSYLVANIA.

DISINTEGRATOR.

SPECIFICATION forming part of Letters Patent No. 676,461, dated June 18, 1901.

Application filed August 24, 1899. Serial No. 728,312. (No model.)

*To all whom it may concern:*

Be it known that I, EMANUEL GEISEL, a subject of the Emperor of Germany, residing at Philadelphia, county of Philadelphia, and State of Pennsylvania, have invented a certain new and useful Improvement in Disintegrators, of which the following is a specification.

My invention relates to a new and useful improvement in disintegrators, and has for its object to so construct and arrange a series of cutters as to adapt them for use in connection with meat-choppers, spice-graters, and the like, whereby considerably less power will be necessary to accomplish the work than by the usual form of disintegrating apparatus; and a still further object of my invention is to provide for the feeding of the material being acted upon by the cutters, and thus in the case of a meat-cutter to deliver all of the meat inserted within the hopper, and thus avoid having to take the apparatus apart to remove that portion of the material which was not delivered.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 3:
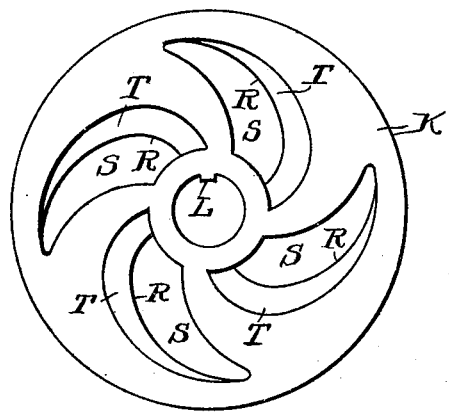
Figure 4:
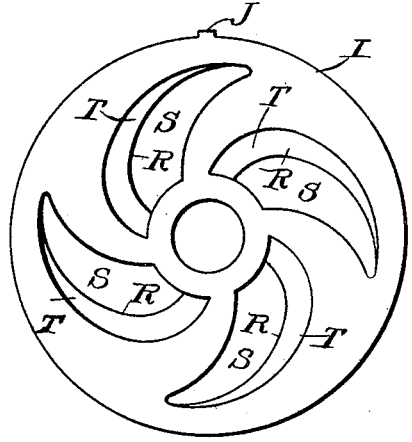
Figure 5:
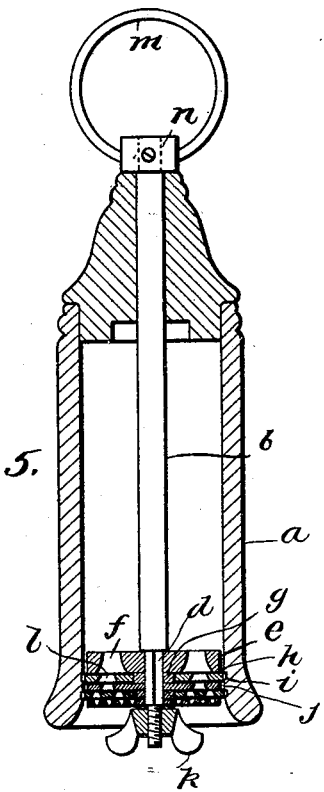

Figure 1 is a section of a meat-chopper made in accordance with my improvement; Fig. 2, a section at the line *x x* of Fig. 1, showing the arrangement of the spiral cutter; Fig. 3, a detail view of one of the rotary cutter-disks; Fig. 4, a similar view of one of the stationary cutter-disks; Fig. 5, a section of a spice-disintegrator made in accordance with my improvement, and Fig. 6 an end view of Fig. 5.

In carrying out my invention as embodied in the meat-cutter (shown in Figs. 1 to 4, inclusive) A represents the casing, which is preferably of cylindrical shape, and has formed therewith or attached thereto the hopper B. The front end of the casing is closed by the head C, which may be secured therein in any suitable manner, and within this head is journaled the spindle D, a crank E being secured thereon, so as to revolve the spindle by hand. A cylindrical hub F is secured upon the spindle D and has formed therewith the spiral cutter G, the latter being so shaped as to shred the meat placed within the hopper B and by operating upon the lower surface of said meat will gradually cut it away, and at the same time feed it forward, as will be readily understood. A block H serves to prevent the meat from revolving with this rotary cutter and thereby facilitate its feeding. A series of cutter-disks I are fitted within the rear portion of the casing and are held against rotation by being splined to the casing, as indicated at J, and these disks have central holes therethrough for the passage of the rear end of the spindle D and likewise serve as a bearing for this portion of the spindle. A second series of cutter-disks K are located upon the spindle and splined thereto, as indicated at L, which will cause them to revolve with the spindle for the purpose hereinafter set forth. M is a washer passed over the spindle and bearing against the outer cutter-disk K, and against this washer the spring N bears, the tension thereof being made adjustable by the nut O, which is run upon the threads P, formed upon the outer end of the spindle D, and this spring is inclosed in the housing-ring Q. The result of this construction is that the cutter-disks are caused to bear firmly against each other by the action of the spring N, so that when the spindle is revolved the revolving of the disks K therewith will cause the cutter edges R to act after the manner of threads upon the stationary disks I, and thereby disintegrate the material being acted upon. The cutter edges are formed in the disks by the cut-away portions S, and an improved feature of the construction of these cutter edges is that the openings through the disk are backed off, as indicated at T, upon the lines of a screw-propeller and always in the same direction, so that the material disintegrated by them will at the same time be fed toward the rear end of the apparatus, and in so doing all of the material, by the continued revolving of the spindle, will be fed from the apparatus, leaving none of such material to clog or remain to become spoiled and require the taking apart of the machine to remove the same. Heretofore this has been a serious disadvantage to ordinary meat-choppers, but is entirely overcome in my construction.

For convenience in holding the apparatus in position upon a table or the like a support U is attached thereto by the screws V, and this support has formed therewith the clamp W, carrying the clamp-screws X, as clearly shown.

I am aware that meat-choppers have been made in which disks were arranged adjacent to each other to disintegrate the material; but the cutting edges of such disks were alternately formed in opposite directions, thereby causing certain of the edges to cut and others to bruise. The feeding of the material was accomplished only by constant pressure from the rear, so that when the means for continuing this pressure could not follow the material through the disks at the end of each operation a certain amount of material was left in the disks, requiring the removal of said disks for cleaning or the leaving of this material to become spoiled and injure the material next operated upon by the apparatus.

In practice I have found that a meat-chopper made in accordance with my improvement requires considerably less power to accomplish the disintegration of the same amount of material, since its entire action is to cut said material in shreds and not mash or break the same. When it is necessary to remove the operating mechanism of the apparatus, the crank E is removed from the spindle, and therefore the spindle and all of the parts carried thereby may be withdrawn from the casing and they may be again replaced in like manner.

Figure 6:
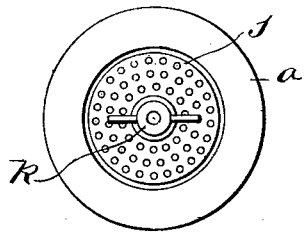

In Figs. 5 and 6 I have shown one form of spice-disintegrator, which consists of the barrel $a$, having the spindle $b$ journaled therein, on which is formed the square extension $d$. A disk $e$ is fitted upon this squared extension, so as to turn therewith, and has four holes $f$ formed therein. These holes, as will be seen, are flared downward, so that the grains of spice falling in these holes will be given a downward tendency by the rotating of the disk, as will be readily understood. Circular bushings $g$ are placed upon the squared extension and have fitted thereon the stationary disks $h$, which are prevented from turning by their edges being roughened, as indicated at $i$, and said roughened edges being forced into the barrel $a$, which is preferably of wood. The disks $j$ are fitted upon the squared extension and turn with the spindle, and consequently in unison with the disk $e$. All of the disks and bushings are secured in place by the thumb-nut $k$ being run upon the threaded end of the spindle. Each of the disks, both rotary and stationary, have holes $l$ formed therein, and these holes are flared downward, so that their upper edges are sharp, while the walls thereof tend to continue the feeding of the material downward, and in practice I prefer to have the holes in each disk smaller in diameter than the one next above, which will continue to reduce the material in size until finally expelling it in the degree of disintegration desired, and the degree of disintegration will be determined by the number of disks and the size of the holes therein. A suitable ring or handle $m$ is attached to the upper end of the spindle by means of the collar $n$, which latter serves to hold the spindle in place, while the handle facilitates the revolving thereof.

Of course I do not wish to be limited to the exact details of construction here shown, as these may be varied to a certain extent without departing from the spirit of my invention, the gist of which rests in the idea of providing a series of disks having openings therethrough, the inner edges of which serve as cutters, while the walls thereof are flared outward to bring about the feeding of the material.

For some purposes it is desirable that the spiral cutter shown in the meat-chopper be omitted and that the disks be arranged horizontally, the casing serving as a hopper after the manner of the spice-disintegrator.

Having thus fully described my invention, what I claim as new and useful is—

In a meat-chopper, the combination of a rotary spindle, a series of stationary disks, each having openings therethrough with the inner edges serving as cutters, and the walls thereof are flared outward upon curved lines after the manner of a propeller, a series of rotary disks alternating with the stationary disks secured upon the spindle so as to be revolved therewith, said disks having openings therethrough with cutting edges and flared walls, a washer passed over the spindle and bearing against the outer cutting-disk, a spring encircling the spindle and bearing against the washer, a nut engaging the end of the spring for regulating its tension on the washer and a housing-ring incasing the spring as and for the purpose described.

In testimony whereof I have hereunto affixed my signature in the presence of two subscribing witnesses.

EMANUEL GEISEL.

Witnesses:
MARY E. HAMER,
L. W. MORRISON.